Dec. 28, 1926.
W. E. TRUMPLER
1,612,329
INDICATING DEVICE FOR SMALL BALANCING MACHINES
Filed Oct. 1, 1923
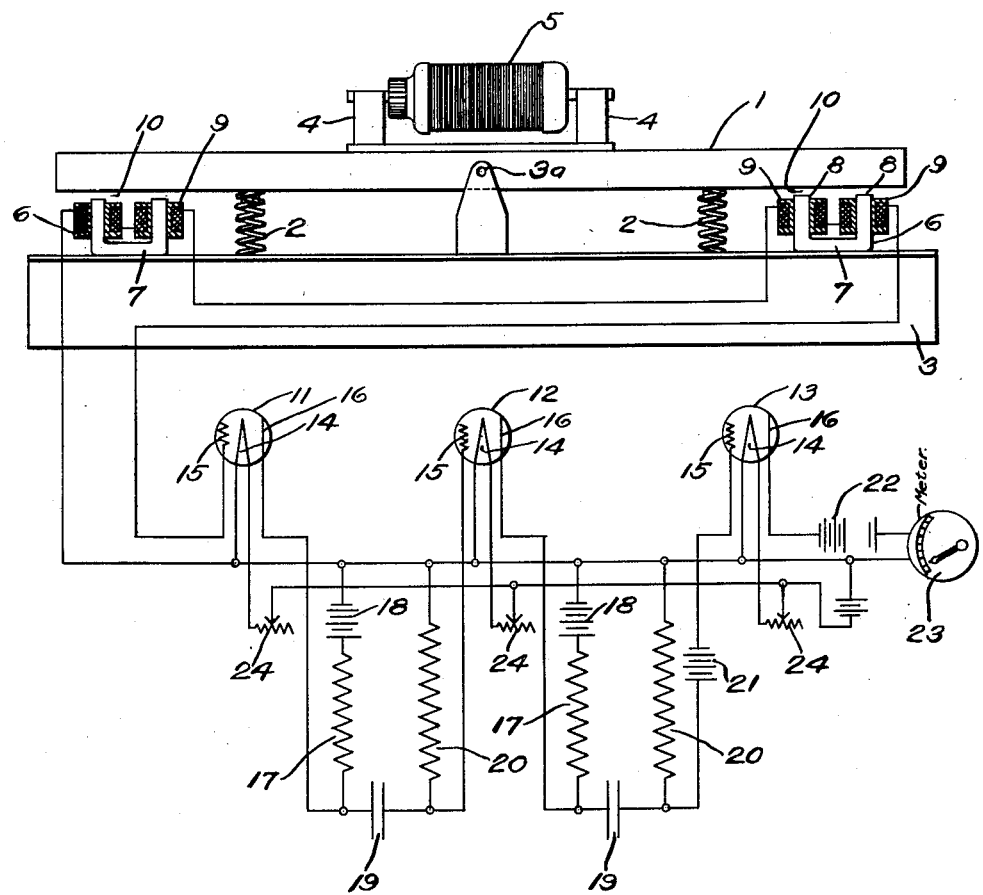
WITNESSES:
INVENTOR
William E. Trumpler.
BY
ATTORNEY Patented Dec. 28, 1926.

1,612,329

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

INDICATING DEVICE FOR SMALL BALANCING MACHINES.

Application filed October 1, 1923. Serial No. 666,026.

My invention relates to balancing machines, more especially to means for determining the degree of unbalance in a body to be tested.

The balance of rotating bodies, both static and dynamic, is essential to the efficient operation and endurance of the bearing members in which they are journalled, especially in the rotors of dynamo-electric machines which operate at relatively high speeds.

In the manufacture of armatures of small motors, the condition of balance is of utmost importance because of the destructiveness of any unbalanced mass on the armature bearings caused by vibration. Various types of balancing machines to test dynamic and static balance in rotors and which vary in design have been proposed but the principle of operation thereof usually permits of a single degree of freedom of motion that indicates the relative unbalance of the rotating body.

This feature is embodied in the use of an oscillatory bed, which is commonly hinged at one end to a supporting base member and is yieldingly supported at its opposite end to provide freedom of motion about the pivot or hinged joint. The rotor to be tested is journalled on the bed and when rotated, the moment of inertia, which is a measure of the unbalanced mass by reason of the distance of its location from the fulcrum or pivot point, causes vibration of the oscillating bed.

My new indicating device is especially adapted to the type of balancing machine in which the bed is supported by springs on the supporting base and is held by a movable fulcrum, although it may be utilized on the type which is hinged at one end. My indicating device is especially useful for balancing machines employed for testing relatively small bodies in which the amount of unbalance is so small that the resultant vibration produced in the oscillatory bed is of such magnitude and frequency as to be difficult of detection by any means heretofore employed.

It is among the objects of my invention to provide an amplifying and indicating device for measuring the amplitude of vibration in balancing machines, which shall be efficient in determining the degree of unbalance of rotating bodies, which shall be extremely sensitive to minute impulses produced by the unbalanced mass of such bodies and which shall be adapted to be utilized in connection with the well known types of balancing devices.

In the accompanying drawing constituting a part hereof and in which like reference characters designate like parts, The single figure is a diagrammatic elevational view of a balancing machine and a measuring device embodying the principles of my invention.

The drawing illustrates an oscillatory bed plate 1 supported by a plurality of coil springs 2 on a supporting base 3, and having a movable fulcrum 3ª therebetween, the bed member 1 being provided with a plurality of bearing blocks 4 adapted to journal a rotor 5, such as an armature of a dynamo-electric machine. A pair of electromagnets 6 each comprising a core member 7 having a plurality of vertically extending legs 8 each adapted to carry a magnet coil 9, is secured to the base 3 in proximity to the bed 1 to provide an air-gap 10 between the bed and the legs 8. The electromagnets 6 are interconnected with an amplifying circuit comprising a plurality of amplifying tubes 11, 12 and 13.

One terminal of the coils 9, which are in series, is connected to the filament 14 and the other terminal is connected to the grid 15 of the tube 11. The plate 16 of the tube 11 is connected with a high resistance 17 to the positive pole of a battery 18, the negative pole of which is connected to one of the filament terminals 14. The plate 16 of the tube 12 is also connected to a similar resistance 17 and battery 18 and the plates of the tubes 11 and 12 are connected to condensers 19 and grid leak resistors 20 as shown in the drawing. The same connections as those of tubes 11 and 12 may be repeated as often as desired depending on the number of amplifying stages it is desired to obtain. The function of the tube 13 is to produce a unidirectional current that may be measured by a direct current instrument and in this respect it functions similarly to a detector tube. The grid 15 of the tube 13 is connected to the negative pole of a battery 21 and the plate 16 thereof is connected by a battery 22 to a measuring instrument 23, such as a D. C. ammeter or voltmeter. I have found that two amplifying tubes and one detector tube give sufficient amplification for very small currents to be measured on a direct current instrument. The filaments of the tubes 11, 12 and 13 are provided with variable resistance elements 24.

In operation, the rotor 5 is rotated in any suitable manner as by a strap or belt passing over the commutator and connected to a source of power. Any unbalanced mass in the rotor produces vibration in the bed 1 which varies the air-gaps 10 between the bed 1 and the legs 8 of the electromagnets. The variation of the air-gaps varies the magnetic flux in the iron cores 7 and the change in the flux produces a current wave or impulse in the coils 9, which current is proportional to the amplitude of vibration and frequency of the bed. The frequency is maintained as constant as is practically possible.

The induced current in the coils 9 is amplified in the tube circuit to a magnitude sufficient to operate the meter 23.

The electromagnets 6 may be movably mounted with the fulcrum 3ª so as to retain the same relative position with respect to the fulcrum axis.

In the type of balancing machine herein illustrated it is desirable to employ a pair of magnets and to dispose them symmetrically with respect to the center of gyration of the vibrating bed and rotating body. In this type of device it has been found that the vibration of the bed is practically uniform for any position of the fulcrum member which is ordinarily maintained within the longitudinal limits of the rotor.

The reading produced on the meter 23 gives the relative value of the degree of unbalance in the rotating body since the amplitude of vibration of the bed 1 is a measure of the moment of inertia produced by the unbalanced mass in the rotor. Accordingly, correction weights may be added to the rotor in a certain relation to the current or voltage indicated on the instrument 23.

Although my device is specially applicable in connection with balancing machines adapted to the testing of unbalance in relatively small, light-weight rotating bodies, it may be so designed and proportioned as to adapt it to larger machines. Although I have illustrated two electromagnets associated with the oscillatory bed it is obvious that a single magnet may be employed where the bed member is hinged at one end and is flexibly supported on its other end. In this case, the electromagnet may be secured at any point on the bed.

It is evident from the foregoing description of my invention that an amplifying and indicating device as illustrated herein is especially useful in determining the amplitude of vibration of relatively small rotating bodies and for this purpose will produce results that will enable the operator to balance rotors with greater precision than has been possible with the use of the rather crude, indicators such as reeds and spring-actuated mechanical measuring instruments heretofore used.

Although I have described a specific embodiment of my invention, it will be obvious to those skilled in the art that my device may be applicable to other uses than herein illustrated and that the details and association of the various parts may be varied without departing from the principles herein set forth.

I claim as my invention:—

1. The combination with an oscillatory member mounted on a yielding support, of an electromagnet secured in proximity thereto and means for amplifying and indicating the current waves produced by the flux variations effected by the change of the air gaps between the magnet and the oscillating member.

2. The combination with an oscillatory member mounted on a yielding support, of an electro-magnet secured in proximity thereto and means for amplifying and indicating the current waves produced by the flux variations effected by the change of the air gaps between the magnet and oscillating member, said means comprising a plurality of amplifying tubes having a measuring instrument in the circuit.

3. In a balancing machine, an oscillatory bed yieldingly supported upon a base, means for supporting the work to be tested on said bed, an electromagnet secured to said base in proximity to said bed, means for energizing said magnet, means for actuating said bed and amplifying and indicating means for determining the amplitude of vibration of the asid bed.

4. In a balancing machine, a bed for carrying a body to be tested yieldingly mounted upon a base, an electromagnet secured on said base in proximity to said bed, an amplifying circuit connected to the coils of said magnet and a measuring instrument connected in said circuit.

5. In a balancing machine, a bed for carrying a body to be tested yieldingly mounted upon a base, an electromagnet secured on said base in proximity to said bed providing an air gap therebetween, means for actuating said bed to vary the air gap and means for measuring the impulses set up in the magnet coils.

6. In a balancing machine, a bed for carrying a body to be tested yieldingly mounted upon a base, an electromagnet secured on said base in proximity to said bed providing an air gap therebetween, means for actuating said bed to vary the air gap and means for amplifying and measuring the impulses set up in the magnet coils.

In testimony whereof, I have hereunto subscribed my name this 26th day of September 1923.

WILLIAM E. TRUMPLER.